United States Patent [19]

Kim

[11] Patent Number: 5,323,619
[45] Date of Patent: Jun. 28, 1994

[54] CONTROL METHOD FOR STARTING AN AIR CONDITIONER COMPRESSOR

[75] Inventor: Tae Duk Kim, Suwon-City, Rep. of Korea

[73] Assignee: Samsung Electronics Co., Ltd., Suwon City, Rep. of Korea

[21] Appl. No.: 59,856

[22] Filed: May 11, 1993

[30] Foreign Application Priority Data

Jun. 18, 1992 [KR] Rep. of Korea ............... 92-10581

[51] Int. Cl.⁵ ............................................. F25B 1/00
[52] U.S. Cl. ................................... 62/160; 62/193; 62/228.4
[58] Field of Search .............. 62/160, 228.1, 228.3, 62/228.4, 226, 227, 229, 208, 209, 215, 193

[56] References Cited

U.S. PATENT DOCUMENTS

| | | | |
|---|---|---|---|
| 4,724,680 | 2/1988 | Kawai | 62/228.4 |
| 4,856,286 | 8/1989 | Sulfstede et al. | 62/228.4 |
| 5,074,120 | 12/1991 | Kitamoto | 62/228.4 |

FOREIGN PATENT DOCUMENTS 0174845  7/1989  Japan ............................... 62/228.4

*Primary Examiner*—Harry B. Tanner
*Attorney, Agent, or Firm*—Burns, Doane, Swecker & Mathis

[57] ABSTRACT

A method of starting a compressor of an air conditioner involves raising the operation frequency of the compressor from zero to a target operation frequency in different patterns (stages), depending upon (1) whether the air conditioner is being operated in a heating mode or a cooling mode, and (2) whether, during a heating mode, the target operation frequency is in a high range, a medium range, or a low range. During a heating mode at either of the high and medium target frequency ranges, the compressor frequency is increased and decreased on its way to reaching the target operation frequency.

8 Claims, 5 Drawing Sheets

COOLING MODE STARTING PATTERN

HEATING MODE STARTING PATTERN I

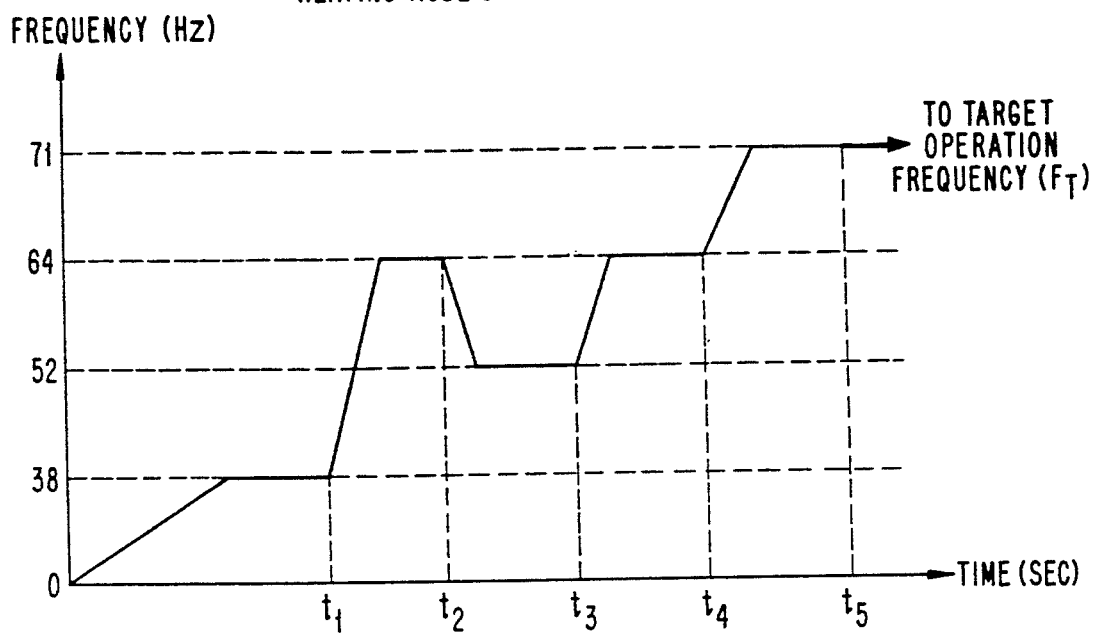
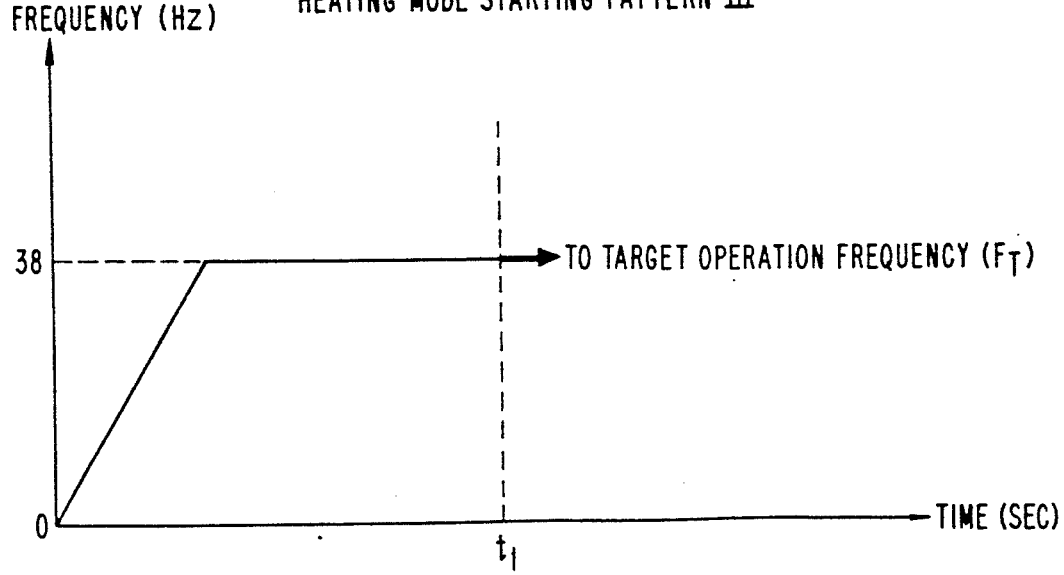

CONTROL METHOD FOR STARTING AN AIR CONDITIONER COMPRESSOR

BACKGROUND OF THE INVENTION

1. Field of the Invention

The present invention involves a control method for starting an air conditioner compressor which can perform either a cooling operation or a heating operation.

2. Description of the Prior Art

In an air conditioner, the heat load varies depending on the indoor and outdoor temperatures. Consequently, the load applied to a compressor also varies in proportion to the heat load, thereby causing variations in the level of oil which is an important factor in the reliability of the compressor. The oil in the compressor serves to reduce or prevent friction between the components therein. When the oil does not reach a sufficient level to prevent the friction due to the abrupt variations in the discharge gas pressure of the compressor, the wall surfaces or vanes of the compressor become worn away. Accordingly, there is a problem in that the life time of the compressor is shortened.

In an air conditioner capable of performing either a cooling operation or a heating operation, it is well known that the discharge gas pressure of the compressor during the heating operation is about three to five times greater than during the cooling operation. Accordingly, it is necessary to control the starting patterns of the compressor during the heating operation mode differently from that during the cooling operation mode.

SUMMARY OF THE INVENTION

It is an object of the present invention to provide a method for controlling a compressor to start by different patterns according to the heat load in an air conditioner capable of performing either a cooling operation or a heating operation, thereby stabilizing the oil level therein.

It is another object of the present invention to provide a method for controlling a compressor to start by different patterns according to the outdoor temperature in an air conditioner capable of performing either a cooling operation or a heating operation, thereby lengthening the life time thereof.

It is still another object of the present invention to provide a method for controlling a compressor to start by different patterns according to the target operation frequency in an air conditioner capable of performing either a cooling operation or a heating operation, thereby increasing the reliability of the air conditioner.

In order to achieve the objects described above, there is a novel control method for starting a compressor of an air conditioner comprising the steps of: determining whether the cooling operation mode or the heating operation mode is selected; receiving the outdoor temperature (To); comparing the outdoor temperature (To) to a reference temperature in the selected operation mode; setting the corresponding rate of increase for the starting frequency of the compressor according to the comparison results; and, starting the compressor at the rate of increase and then operating the frequency at a target operation frequency ($F_T$).

BRIEF DESCRIPTION OF THE DRAWINGS

The foregoing objects and advantages may be more fully understood by reading the description of the preferred embodiment with reference to the accompanying drawings wherein:

FIGS. 3 to 5 are three wave-form diagrams showing different starting patterns predetermined by high, medium, and low values, respectively, of a target operation frequency in the heating operation mode; and, FIGS. 6A and 6B are respective portions of a flow chart showing the control method for starting a compressor according to the present invention.

DETAILED DESCRIPTION OF THE PREFERRED EMBODIMENT

Figure 1:
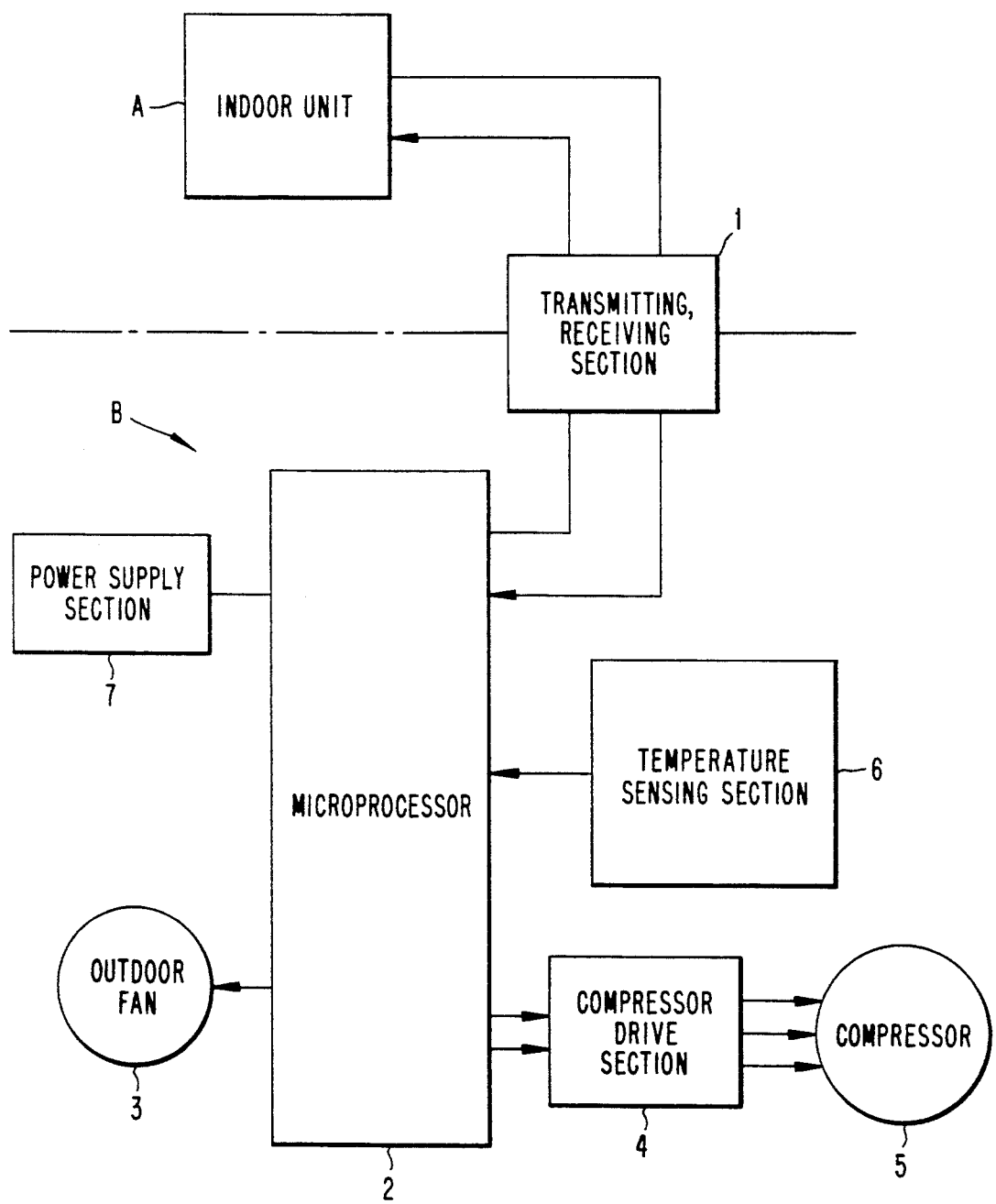
FIG. 1 is a schematic diagram of an air conditioner to which a method of the present invention is applied.
Figure 2:
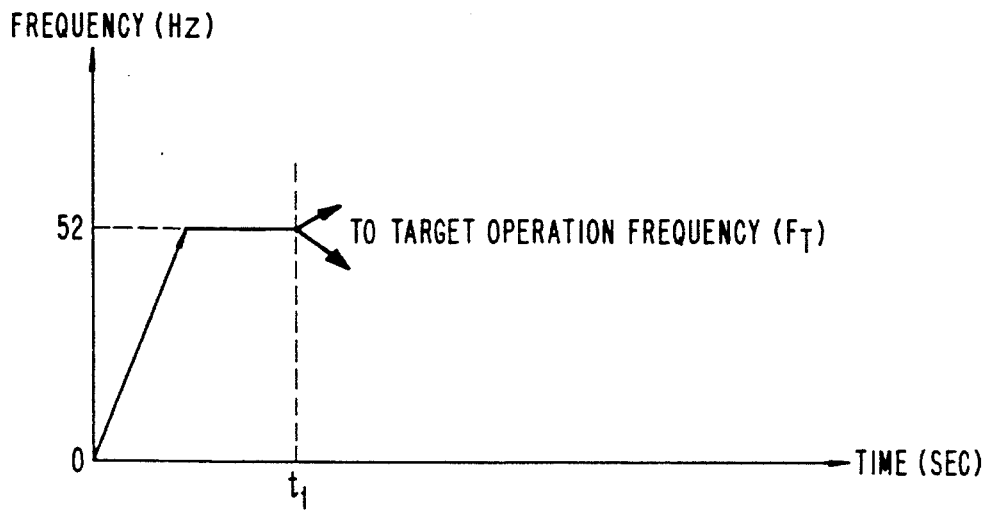
FIG. 2 is a wave-form diagram showing the starting pattern of a compressor in the cooling operation mode according to this invention.
Figure 3:
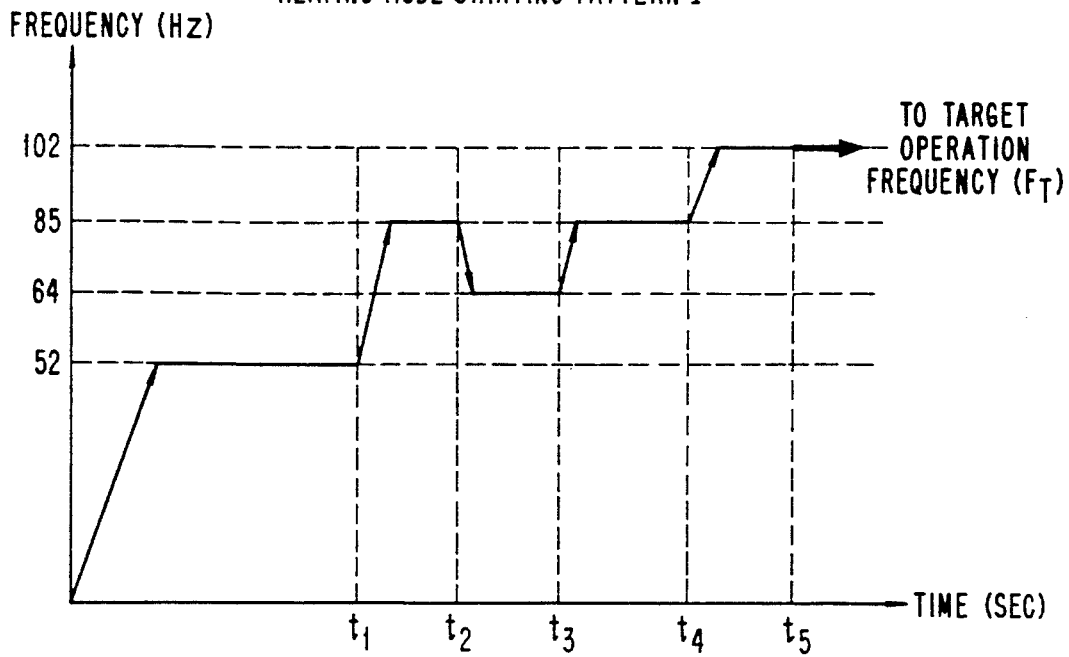
Figure 6A:
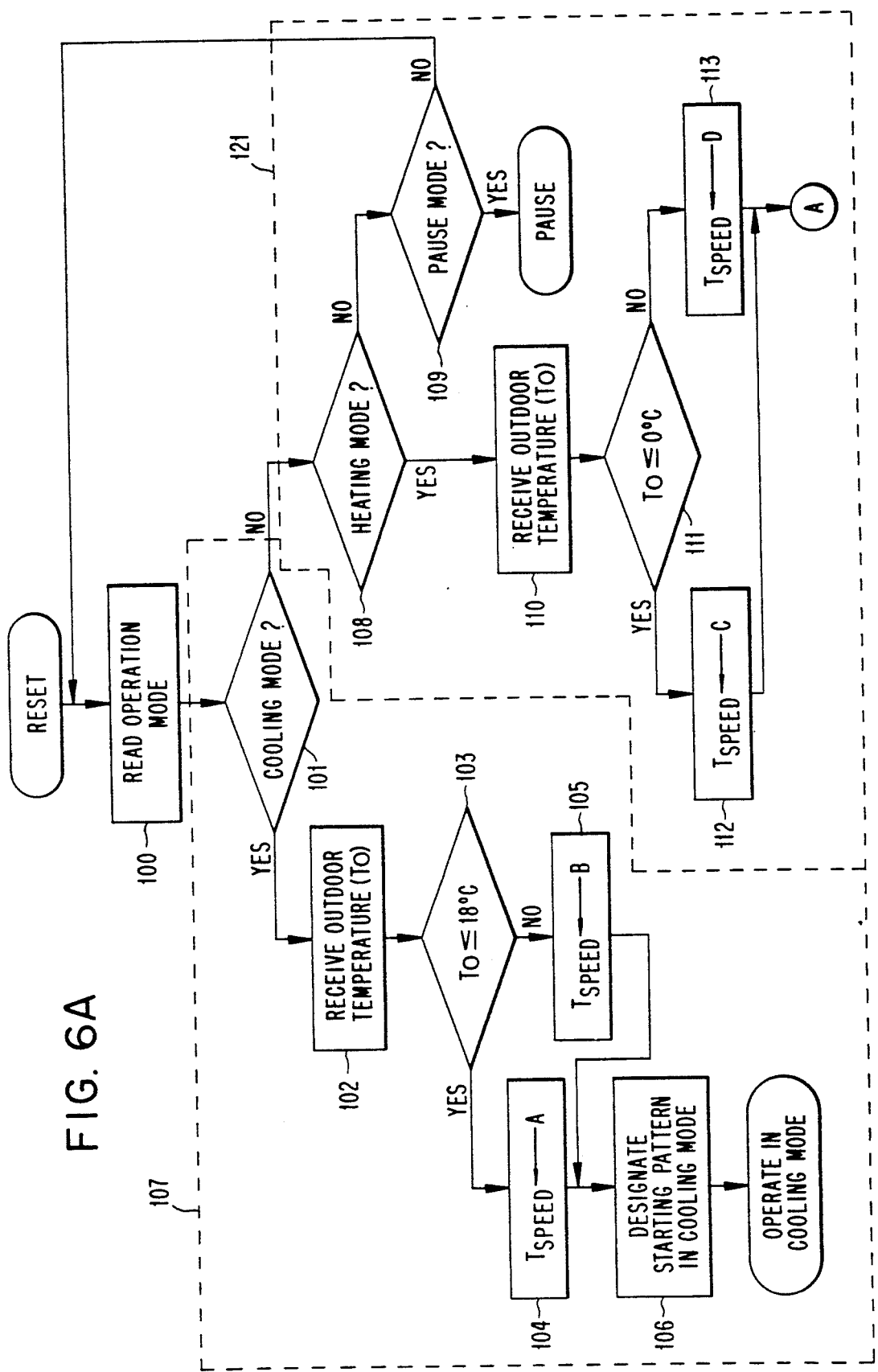
Figure 6B:
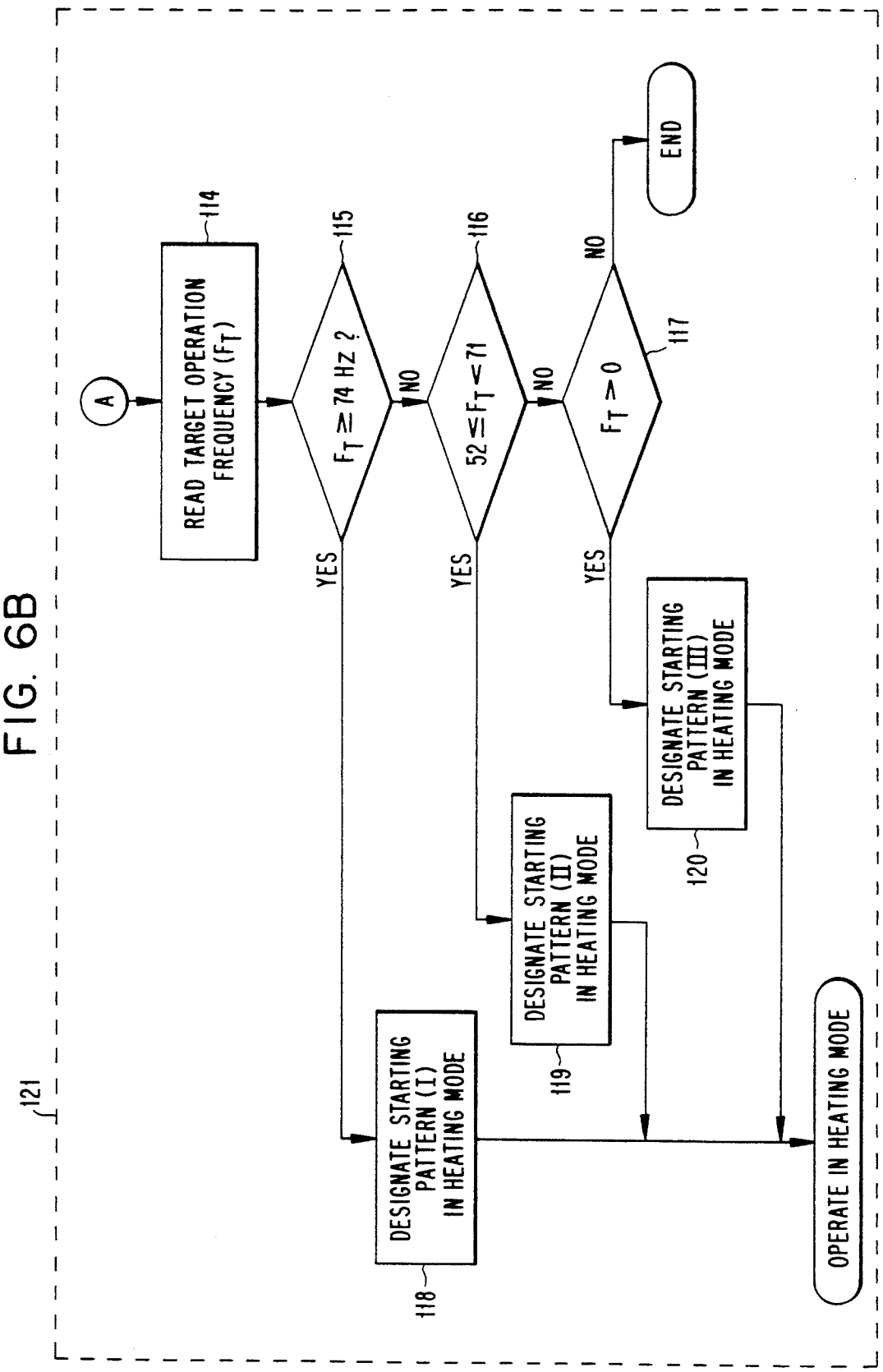

Hereinafter, a preferred embodiment of the present invention will be described in detail with reference to the accompanying drawings. FIG. 1 is a schematic diagram of an air conditioner to which the method of the present invention is applied. As shown in FIG. 1, an air conditioner may be divided into roughly two units - an indoor unit A and an outdoor unit B. The outdoor unit B comprises a microprocessor 2 for controlling the entire operation of the outdoor unit B, a transmitting-/receiving section 1 for interfacing the indoor unit A (more specifically, the indoor microprocessor; not shown) with the microprocessor 2, an outdoor fan 3 for forcibly liquefying (in the cooling operation mode) or evaporating (in the heating operation mode) the refrigerant in the outdoor heat exchanger, a compressor 5, a compressor driving section 4 for operating compressor 5 according to the control signal from the microprocessor 2, and a temperature sensing section 6 for sensing: (i) the outdoor temperature (To), (ii) an outdoor tube temperature, (iii) a surface temperature of compressor 5 and (iv) a discharge gas temperature of compressor 5. Reference numeral 7 denotes a power supply section. FIG. 2 is a wave-form diagram showing the starting pattern of a compressor in the cooling operation mode. FIGS. 3 to 5 are wave-form diagrams showing different starting patterns predetermined by the value of a target operation frequency in the heating operation mode. FIGS. 6A and 6B show a flow chart showing a compressor starting control method.

When a user turns the operation switch (not shown) for the air conditioner "ON" and selects several operation instructions such as the desired operation mode, e.g., the amount of the air, the direction of the air, the desired room temperature, etc., the microprocessor (not shown) of the indoor unit A transmits the selected instructions to microprocessor 2 in the outdoor unit B via the transmitting/receiving section 1. The microprocessor in the indoor unit A also calculates a target operation frequency ($F_T$) based on the instructions and temperature signals and transmits the target operation frequency ($F_T$) to the microprocessor 2. The microprocessor 2 then generates a control signal for operating compressor 5 according to the target operation frequency ($F_T$). In operating compressor 5 in the manner described above, microprocessor 2 determines at stage 101 (see FIG. 6A) whether the selected mode is a cooling operation mode. When the selected mode is the cooling operation mode, the control process goes to stage 102 of the cooling operation sequence 107, where microprocessor 2 receives the outdoor temperature (To) from temperature sensing section 6. At stage 103, it is determined whether or not the outdoor temperature (To) is higher than a first reference temperature, for example 18° C. When the outdoor temperature (To) is below 18° C., the rate of increase (Tspeed) of the starting frequency of compressor 5 is set to a value of A (stage 104). To the contrary, when the outdoor temperature (To) is above 18° C., the rate of increase (Tspeed) of the starting frequency of compressor 5 is set to a value of B (stage 105), where B is greater than A. That rate of increase (Tspeed) is controlled to be different with each other is aimed not to immoderately operate the compressor 5. For example, let A=1, B=2. When the outdoor temperature (To) is below 18° C., compressor 5 is started at the slow increasing rate of 1 Hz per 1 second. On the other hand, when the outdoor temperature (To) is above 18° C., compressor 5 is started at the fast increasing rate of 2 Hz per 1 second.

In FIG. 2, after the operation frequency reaches a predetermined value, for example 52 Hz, compressor 5 is operated at 52 Hz for a predetermined time and then the operation frequency is converted into the target frequency ($F_T$).

The control method for starting the compressor in the heating operation mode will be now described. Generally, the discharge gas pressure in the heating operation mode is relatively greater than that in the cooling operation mode. Accordingly, it is necessary to control compressor 5, considering the effect that the rate of increase has on the oil level. At stage 108, it is determined whether the selected mode is in the heating operation mode. When the selected mode is in the heating operation mode, the heating operation sequence 121 is initiated wherein microprocessor 2 receives the outdoor temperature (To) from temperature sensing section 6 at stage 110. At stage 111, it is determined whether the outdoor temperature (To) is higher than a second reference temperature, for example 0° C. When the outdoor temperature (To) is below 0° C., the increasing rate (Tspeed) of the starting frequency of compressor 5 is set to a value of C (stage 112). To the contrary, when the outdoor temperature (To) is above 0° C., the rate of (Tspeed) of the starting frequency of compressor 5 is set to a value of D, where D (stage 113) is greater than C. That rate of increase (Tspeed) is controlled to be different from each other and is aimed not to immoderately drive the compressor 5.

Microprocessor 2 reads the target operation frequency ($F_T$) at stage 114, and then controls the operation of compressor 5 according to various pre-set patterns determined by the value of the target operation frequency ($F_T$) at stages 115 to 120. That is, when the target operation frequency ($F_T$) is in the "HIGH" frequency range, for example above 74 Hz, compressor 5 is started in a pattern I comprised of a sequence of steps represented in FIG. 3: (1) increasing the frequency from zero to 52 Hz and then maintaining 52 Hz, (2) increasing the frequency to 85 Hz at time $t_1$ and then maintaining 85 Hz, (3) decreasing the frequency to 64 Hz at time $t_2$ and then maintaining 64 Hz, (4) increasing the frequency to 85 Hz at time $t_3$ and then maintaining 85 Hz, and (5) increasing the frequency to 102 Hz at time $t_4$ and then maintaining 102 Hz as shown in FIG. 3. Then, at time $t_5$, the compressor 5 is operated at the target operation frequency ($F_T$).

When the target operation frequency ($F_T$) is in the "MIDDLE" frequency range, for example a frequency range of 52 Hz to 74 Hz, compressor 5 is started in a pattern II somewhat similar to the pattern I of the "HIGH" frequency range. However, the values to which the operation frequency is increased and then maintained or decreased and then maintained are different from those in the "HIGH" frequency range. In FIG. 4, compressor 5 is started in a sequence of steps: (1) increasing the frequency from zero to 38 Hz and then maintaining 38 Hz, (2) increasing the frequency to 64 Hz at time $t_1$ and then maintaining 64 Hz, (3) decreasing the frequency to 52 Hz at time $t_2$ and then maintaining 52 Hz, (4) increasing the frequency to 64 Hz at time $t_3$ and then maintaining 64 Hz, and (5) increasing the frequency to 71 Hz at time $t_4$ and then maintaining 71 Hz. Then, at time $t_5$, the compressor is operated at the target operation frequency ($F_T$).

Finally, when the target operation frequency ($F_T$) is in the "LOW" frequency range, for example below 38 Hz, compressor 5 is started in a pattern III similar to the cooling operation mode.

In FIG. 5, compressor 5 is started by increasing the frequency from zero to 38 Hz and then maintaining 38 Hz and then is operated at the target operation frequency ($F_T$).

I claim:

1. A control method for starting a compressor of an air conditioner capable of selective operation in heating and cooling modes, said method comprising the steps of:
   A. determining which of the cooling and heating mode modes is selected;
   B. establishing a target operation frequency for the compressor associated with the selected mode;
   C. sensing an outdoor temperature;
   D. comparing outdoor temperature to a reference temperature associated with the selected mode;
   E. determining a rate of increase of operation frequency in accordance with the comparison results of step D;
   F. starting the compressor by applying an operation frequency thereto and increasing said operation frequency from zero at said determined rate of increase; and
   G. bringing the operation frequency to said target operation frequency and thereafter operating the compressor at said target operation frequency.

2. A control method for starting a compressor of an air conditioner capable of selective operation in heating and cooling modes, said method comprising the steps of:
   A. determining which of the cooling and heating mode modes is selected;
   B. establishing a target operation frequency for the compressor associated with the selected mode;
   C. sensing an outdoor temperature;
   D. comparing the outdoor temperature to a reference temperature associated with the selected mode;
   E. determining a rate of increase of operation frequency in accordance with the comparison results of step D;
   F. starting the compressor by applying an operation frequency thereto and increasing said operation frequency at said determined rate of increase; and
   G. bringing the operation frequency to said target operation frequency and thereafter operating the compressor at said target operation frequency;
   wherein when a cooling mode is determined in step A, step E comprises setting a rate of increase of operation frequency which, when the reference temperature exceeds the outdoor temperature, is lower than when the outdoor temperature exceeds the reference temperature.

3. A control method for starting a compressor of an air conditioner capable of selective operation in heating and cooling modes, said method comprising the steps of:

A. determining which of the cooling and heating mode modes is selected;

B. establishing a target operation frequency for the compressor associated with the selected mode;

C. sensing an outdoor temperature;

D. comparing the outdoor temperature to a reference temperature associated with the selected mode;

E. determining a rate of increase of operation frequency in accordance with the comparison results of step D;

F. starting the compressor by applying an operation frequency thereto and increasing said operation frequency at said determined rate of increase; and G. bringing the operation frequency to said target operation frequency and thereafter operating the compressor at said target operation frequency;

wherein when a heating mode is determined in step A, step E comprises setting a rate of increase of operation frequency which, when the reference temperature exceeds the outdoor temperature, is lower than when the outdoor temperature exceeds the reference temperature.

4. A control method for starting a compressor of an air conditioner capable of selective operation in heating and cooling modes, said method comprising the steps of:

A. determining which of the cooling and heating mode modes is selected;

B. establishing a target operation frequency for the compressor associated with the selected mode;

C. sensing an outdoor temperature;

D. comparing the outdoor temperature to a reference temperature associated with the selected mode;

E. determining a rate of increase of operation frequency in accordance with the comparison results of step D;

F. starting the compressor by applying an operation frequency thereto and increasing said operation frequency at said determined rate of increase; and G. bringing the operation frequency to said target operation frequency and thereafter operating the compressor at said target operation frequency;

wherein when a heating mode is determined in step A, there is performed, prior to step G, the step of:

F1. selecting, in accordance with the magnitude of the established target operation frequency, one of a plurality of frequency range patterns for bringing the compressor to said established target operation frequency.

5. A control method according to claim 4, wherein step F1 comprises selecting, in accordance with the magnitude of the established target operation frequency, one of first, second, and third frequency patterns associated with high, medium and low ranges, respectively, of said target operation frequency.

6. A control method according to claim 5, wherein each of said first and second frequency patterns comprises:

(a) increasing the frequency from zero to a first value, and maintaining said frequency at said first value for a time interval, then (b) increasing the frequency from said first value to a second value and maintaining said frequency at said second value for a time interval, then (c) decreasing the frequency from said second value to a third value lying between said first and second values and maintaining said frequency at said third value for a time interval, then (d) increasing the frequency from said third value to a fourth value, and maintaining the frequency at said fourth value for at time interval, and then (e) increasing the frequency from said fourth value to a fifth value and maintaining the frequency at said fifth value for a time interval.

7. A control method according to claim 6, wherein each of said first, second, third, fourth and fifth values is higher in said first frequency pattern than in said second frequency pattern.

8. A control method according to claim 7, wherein said third frequency pattern comprises increasing the frequency from zero to a value equal to said first value of said second frequency range, and maintaining the frequency at that value for a time interval.

* * * * *